June 14, 1960 M. A. CHILCOAT 2,940,472
CHECK VALVE
Filed Feb. 25, 1957
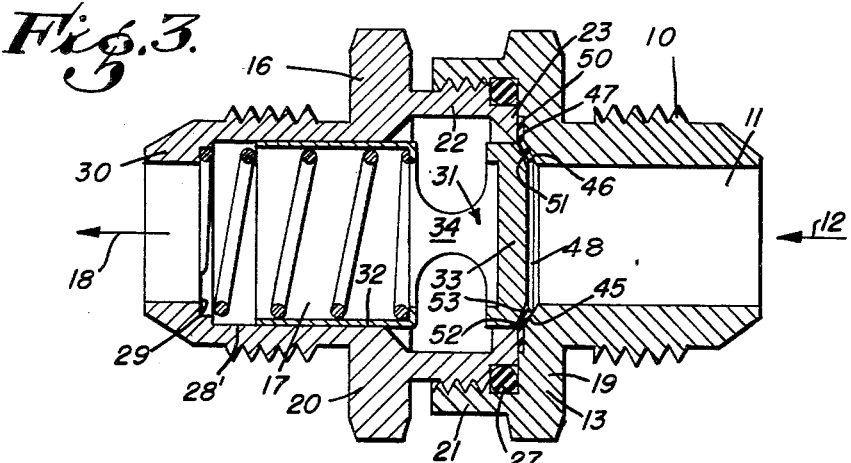
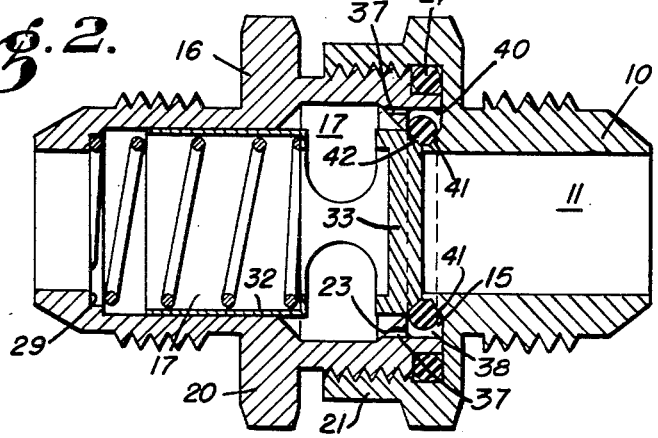
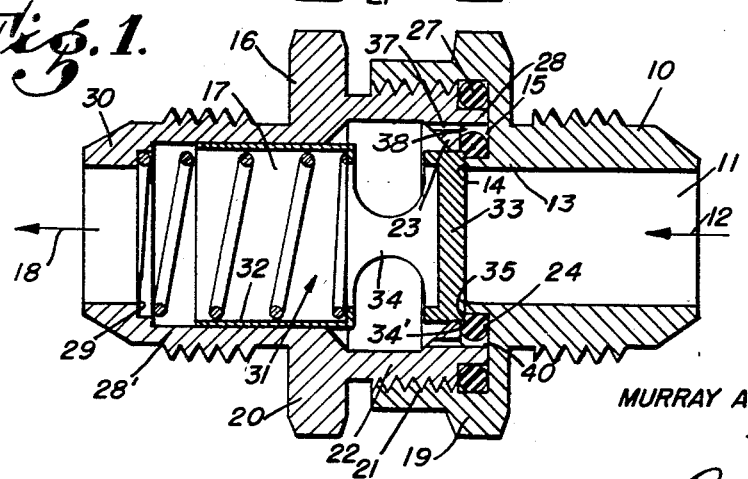
MURRAY A. CHILCOAT,
INVENTOR.
BY
Attorney

United States Patent Office 2,940,472
Patented June 14, 1960

2,940,472

CHECK VALVE

Murray A. Chilcoat, Monterey Park, Calif., assignor to Futurecraft Corporation, El Monte, Calif., a corporation of California Filed Feb. 25, 1957, Ser. No. 642,105

5 Claims. (Cl. 137—540)

This invention relates in general to valves for controlling the flow of fluids through ducts and relates in particular to a simple and efficient check valve adapted to be incorporated in the fuel lines of jet engines.

It is an object of the invention to provide a simple check valve construction having two body parts adapted to be connected in end to end relation, a check valve element movable in one of these body parts and means operating in consequence of the securing of the two body parts together to hold a sealing ring in position for engagement by the check valve element.

It is a further object of the invention to provide an inlet body member and an outlet body member arranged to be connected together in end to end relation, the inlet body member having a fluid inlet passage with an annular shoulder at the inner end thereof, and the outlet body having at its end an annular wall contiguous to the annular shoulder, for holding in operative position a sealing ring adapted to be engaged by a check valve element which is movable within the outlet body.

It is a further object of the invention to provide the annular shoulder at the inner end of the inlet body with an annular channel faced toward the outlet body, this channel being adapted to receive a sealing ring of the type normally referred to as an O-ring, the outlet body having at its inner end an annular wall positioned so as to hold the sealing ring in the channel with an annular portion thereof exposed for engagement by the check valve element.

It is a further object of the invention to provide in a check valve of the character described in the foregoing means for delivering fluid under pressure from the passage of the outlet body into the space in the channel surrounding the sealing ring, so that this pressure will act to hold the sealing ring tightly in engagement with the check valve element.

It is a further object of the invention to provide a simple device of this character wherein a simple flat type of sealing ring and means for holding the same in operative position are provided.

Further objects and advantages of the invention may be brought out in the following part of the specification wherein some small details have been described for the purpose of making a complete disclosure without intending, however, to limit the scope of the invention which is defined in the appended claims.

Referring to the accompanying drawings which are for illustrative purposes only:

Fig. 1 is a longitudinal sectional view of a preferred form of the invention;

Fig. 2 is a longitudinal section showing an alternative form of the invention; and Fig. 3 is a longitudinally sectioned view showing another form of the invention.

The form of the invention shown in Fig. 1 includes an inlet body 10 having an inlet passage 11 extending from end to end thereof and being adapted to receive a flow of fluid in the direction indicated by the arrow 12. At the inner end 13 of the inlet body 10 there is an annular shoulder 14 surrounding the inner end of the inlet passage 11, and surrounding this shoulder 14 there is an annular channel 15 which is faced toward the body part 16.

The outlet body 16 has an outlet passage 17 extending from end to end thereof, for the outlet flow of fluid from the valve, indicated by an arrow 18. The bodies 10 and 16 are both tubular or cylindrical and are respectively provided with flanges 19 and 20 at their inner ends. The inlet body 10 has a threaded cylindrical wall 21 for engagement with the cylindrical wall 22 at the inner (rightward) end of the outlet body 16. The cylindrical wall 22 of the outlet body 16 has adjacent its inner end an annular wall 23 which is contiguous to the shoulder 14 when the inlet and outlet bodies 10 and 16 are secured together as shown. The annular wall 23 cooperates in holding a sealing ring 24 in the channel 15. This sealing ring 24 is made from a rubbery material and is known as an O-ring. In the outer portion of the channel 15, there is a second O-ring 27 which is separated from the O-ring 24 by a short cylindrical lip 28 which projects from the inner end of the wall 22 into the channel 15.

The outlet passage 17 of the outlet body 16 is defined in part by a cylindrical wall 28' having a shoulder 29 adjacent the outer end 30 of the outlet body 16. Within the outlet body 16 there is a check valve element 31 having a tubular wall portion 32 constituting a guide in sliding relation to the cylindrical wall 28' of the outlet body 16, a circular inner end wall 33 for closing the inner end of the inlet passage 11 and webs 34 for connecting the end wall 33 to the tubular wall 32. When the connector parts 10 and 16 are assembled, as shown in Fig. 1, the O-ring is approximately enclosed by an inner cylindrical wall which supports the shoulder 14, the outer cylindrical wall 28', the radial bottom wall 40 of the channel 15 and the radial wall provided by the annular wall 23. The shoulder 14 constitutes a stop for the check valve element 31 and prevents the O-ring 24 from being injured by excess pressure applied thereto by the lip 35.

The annular wall 23 is positioned with relation to the shoulder 14 so as to leave an annular portion 34' of the ring 24 exposed for engagement by lip 35 formed on the periphery of the circular inner end wall 33 of the check valve element 31. A number of small openings 37 are extended through the annular wall 23 so as to connect the outlet fluid passage 17 of the outlet body 16 with the annular space 38 in the channel 15 surrounding the O-ring 24. When the circular end wall 33 of the check valve element 31 closes the passage 11, as shown in Fig. 1, fluid pressure from the interior of the outlet body 16 enters the space 38 through the openings 37 and forces the O-ring 24 radially inwardly into tight engagement with the lip 35, assuring a perfect sealing effect which increases as the pressure in the outlet passage 17 is increased.

In the form of the invention shown in Fig. 2, the structure of Fig. 1 is repeated except for the fact that in this form of the invention the bottom wall 40 of the ring-receiving channel 15 has a conoidal wall 41 to urge the O-ring 24 toward a conoidal wall 42 formed on the peripheral portion of the end wall 33. In a manner similar to that described relative to Fig. 1, when the check valve element 31 is in the flow-checking position in which it is shown, fluid under pressure from the outlet passage 17 of the outlet body 16 passes through the openings 37 in the annular wall 23 of the outlet body 16 into the outer annular space 38 of the channel 15 so that the O-ring 24 is forced radially inwardly toward the conoidal walls 41 and 42.

In the form of the invention shown in Fig. 3, the annular channel 15 is omitted and a shoulder 45 is provided at the inner end of the passage 11 having a sloping or conoidal portion 46 surrounded by a radial portion 47. The annular wall 23 cooperates with the radial wall portion 47 in clamping the outer portion of a sealing ring 48 in operative position. The sealing ring 48 is made from a flexible, durable material, such as Teflon, and has the appearance of a circular disc with a circular opening therethrough. When the outer portion 50 of the ring 48 is clamped between the walls 23 and 47, the inner portion 51 thereof lies over the sloping face 46 and is therefore positioned for engagement by the peripheral portion 52 of an annular conoidal surface 53 formed on the end wall 33 of the check valve element 31.

I claim:

1. In a valve: a passage; an annular shoulder surrounding said passage, said shoulder having therein a ring-receiving channel defined by an inner cylindrical wall, an outer cylindrical wall and a generally radial wall connecting the same; a second radial annular wall contiguous to said annular shoulder and being of larger inner diameter than said inner cylindrical wall so as to partly close said channel and leave said channel with an annular opening faced toward said passage; a sealing ring in said channel of smaller diameter than the diameter of said outer cylindrical wall to provide an annular space therebetween, said ring being held within said channel by said walls, with an annular portion of said ring adapted to be exposed toward said passage through said annular opening; a valve element movable in said passage toward said annular shoulder in response to fluid pressure in said passage, said valve element having a circular inner end portion provided with a peripheral lip positioned so as to enter said annular opening and engage said annular portion of said sealing ring; and opening means connecting said passage with said channel radially outwardly from said ring so that fluid pressure in said passage will act to force said ring inwardly within said channel toward said annular opening into engagement with the lip of said valve element to provide a seal around said lip, said shoulder engaging the inner end portion of said valve element to limit the movement of said valve element in response to fluid pressure in said passage, the portion of said annular opening between said second radial wall and the lip of said valve element being subject to fluid pressure in said passage to prevent the extrusion of said ring through said annular opening.

2. In a valve: a passage; an outer cylindrical wall; an annular shoulder spaced from said outer cylindrical wall, said annular shoulder forming an annular ring-receiving channel surrounding said passage, said shoulder providing an inner cylindrical wall for said channel extending parallel to the axis of said passage and a radial wall extending radially between said inner and outer walls; an annular wall contiguous to said shoulder, said annular wall being spaced from the radial wall of said channel, said inner wall and the radially inward end of said annular wall terminating short of intersection to provide an annular opening faced toward said passage at one corner of said channel; a sealing ring disposed within said channel, with an annular portion of said ring adapted to be exposed toward said passage through said opening, the cross sectional diameter of said ring being substantially equal to the distance between said radial walls and less than the distance between said cylindrical walls to provide an annular space within said channel surrounding said ring; a valve closure movable in said passage toward said annular shoulder in response to fluid pressure in said passage, said valve closure having a circular portion provided with a peripheral corner lip positioned so as to enter said annular opening upon movement of said valve closure toward said shoulder, said shoulder engaging said circular portion of said valve closure to limit its movement in response to pressure in said passage; and opening means in said annular wall connecting said passage with said annular space so that fluid pressure in said passage will act to force said annular portion of said ring into engagement with said lip of said valve closure to provide a seal around said valve closure, the portion of said annular opening between said annular radial wall and said lip being subject to fluid pressure in said passage to prevent the extrusion of said ring through said annular opening.

3. In a valve: a passage; an annular shoulder surrounding said passage forming an annular ring-receiving channel, said channel having spaced inner and outer cylindrical walls and spaced radial walls, said inner wall and one of said radial walls terminating short of intersection to provide an annular opening faced toward said passage at one corner of said channel; a sealing ring disposed within said channel, with an annular portion of said ring adapted to be exposed toward said passage through said annular opening, the cross-sectional diameter of said sealing ring being substantially equal to the distance between said radial walls and less than the distance between said inner and outer walls to provide an annular space within said channel surrounding said ring; a valve closure movable in said passage toward said channel in response to fluid pressure in said passage, said valve closure having a circular portion provided with a peripheral corner lip positioned so as to enter said annular opening and engage the annular portion of said ring upon movement of said valve closure toward said channel; and opening means connecting said passage with said annular space so that fluid pressure in said passage will act to force said ring inwardly within said channel toward said lip to provide a seal around said lip, the portion of said annular opening between said lip and said shorter radial wall being subject to fluid pressure in said passage to prevent the extrusion of said ring through said opening.

4. In a valve: a passage; an outer cylindrical wall; an annular shoulder spaced from said outer cylindrical wall, said annular shoulder forming an annular ring-receiving channel surrounding said passage, said shoulder providing an inner cylindrical wall for said channel extending parallel to the axis of said passage and a radial wall extending radially between said inner and outer walls; an annular radial wall contiguous to said shoulder, said annular radial wall being spaced from the radial wall of said channel, said inner wall and the radially inner end of said annular wall terminating short of intersection to provide an annular radial opening faced toward said passage at one corner of said channel; a sealing ring disposed within said channel, with an annular portion of said ring adapted to be exposed toward said passage through said opening, the cross-sectional diameter of said ring being substantially equal to the distance between said radial walls and less than the distance between said cylindrical walls to provide an annular space within said channel surrounding said ring; a valve closure movable in said passage toward said annular shoulder in response to fluid pressure in said passage, said valve closure having a circular inner end, said shoulder engaging said inner end of said valve closure to limit the movement of said valve closure in response to fluid pressure in said passage, said inner end of said valve closure having an annular peripheral portion positioned so as to engage the annular portion of said ring which is exposed toward said passage upon the movement of said valve closure into engagement with said shoulder; and opening means in said annular wall connecting said passage with said annular space so that fluid pressure in said passage will act to force said annular portion of said ring into engagement with said peripheral portion of the inner end of said valve closure to provide a seal around the inner end of said valve closure, the portion of said annular opening between said annular radial wall and said valve closure being subject to fluid pressure in said passage to prevent the extrusion of said ring through said annular opening.

5. In a valve: a passage; an annular shoulder surrounding said passage forming an annular ring-receiving channel, said channel having spaced inner and outer cylindrical walls and spaced radial walls, said inner wall and one of said radial walls terminating short of intersection to provide an annular opening faced toward said passage at one corner of said channel; a sealing ring disposed within said channel, with an annular portion of said ring adapted to be exposed toward said passage through said annular opening, the cross-sectional diameter of said sealing ring being less than the distance between said inner and outer walls to provide an annular space within said channel surrounding said ring; a valve closure movable in said passage toward said channel in response to fluid pressure in said passage, said valve closure having a circular inner end provided with a peripheral portion positioned so as to engage the annular portion of said ring which is exposed toward said passage upon the movement of said valve closure toward said channel; and opening means connecting said passage with said annular space so that fluid pressure in said passage will act to force said ring inwardly within said channel toward the inner end of said valve closure to provide a seal around the peripheral portion of the inner end of said valve closure, the portion of said annular opening between said valve closure and said shorter radial wall being subject to fluid pressure in said passage to prevent the extrusion of said ring through said opening.

References Cited in the file of this patent

UNITED STATES PATENTS

| | | |
|---|---|---|
| 987,218 | Cordley | Mar. 21, 1911 |
| 2,353,161 | Heigis | July 11, 1944 |
| 2,525,799 | Hecker | Oct. 17, 1950 |
| 2,574,054 | Miller | Nov. 6, 1951 |
| 2,616,653 | Tarr | Nov. 4, 1952 |
| 2,653,792 | Sacchini | Sept. 29, 1953 |
| 2,673,062 | Cornelius | Mar. 23, 1954 |
| 2,676,782 | Bostock | Apr. 27, 1954 |
| 2,747,611 | Hewitt | May 29, 1956 |
| 2,847,182 | Mancusi | Aug. 12, 1958 |
| 2,910,267 | Holby | Oct. 27, 1959 |